(12) United States Patent
Ardrey et al.

(10) Patent No.: US 6,239,925 B1
(45) Date of Patent: May 29, 2001

(54) INSTRUMENT CLUSTER LENS ASSEMBLY AND METHOD OF MAKING

(75) Inventors: Kenneth J. Ardrey, Canton; Hans J. Herfurth, Ann Arbor; Sandip R. Mehta, Canton, all of MI (US)

(73) Assignee: Key Plastics, Inc., Novi, MI (US)

( * ) Notice: Subject to any disclaimer, the term of this patent is extended or adjusted under 35 U.S.C. 154(b) by 0 days.

(21) Appl. No.: 09/390,594

(22) Filed: Sep. 3, 1999

(51) Int. Cl.[7] .............................. G02B 3/00; G02B 7/02
(52) U.S. Cl. .................... 359/819; 359/810; 359/811
(58) Field of Search .................... 359/819, 810, 359/811; 353/31, 34, 35; 156/73.1

(56) References Cited

U.S. PATENT DOCUMENTS

| | | | |
|---|---|---|---|
| 4,053,953 | * 10/1977 | Flom et al. | 623/6.38 |
| 4,069,080 | * 1/1978 | Osborne | 156/272.8 |
| 4,993,007 | 2/1991 | Meister | 368/294 |
| 5,135,592 | 8/1992 | Melvin | 156/73.1 |
| 5,141,677 | 8/1992 | Fogarty | 264/1.4 |
| 5,152,788 | 10/1992 | Isaacson et al. | 623/6 |
| 5,236,759 | 8/1993 | Sakurai | 428/76 |
| 5,645,666 | * 7/1997 | Jones | 156/73.1 |
| 5,793,540 | * 8/1998 | Ohtsuki et al. | 359/819 |
| 5,929,450 | * 7/1999 | Glasheen et al. | 250/372 |
| 6,040,550 | * 3/2000 | Chang | 219/121.63 |
| 6,123,465 | * 9/2000 | Hashizume | 385/93 |

\* cited by examiner

*Primary Examiner*—Scott J. Sugarman
*Assistant Examiner*—Saeed Seyrafi
(74) *Attorney, Agent, or Firm*—Rader, Fishman & Grauer PLLC

(57) ABSTRACT

An instrument cluster lens assembly includes a lens having top and bottom surfaces and a mounting portion that is mounted on a base having at least one lens receiving portion. The lens mounting portion is laser welded to the lens receiving portion of the base to securely connect the lens to the base thereby forming the lens assembly for an instrument cluster. Preferably, the lens mounting portion is transparent to laser light and the lens receiving portion of the base is opaque to laser light. A method of forming the instrument cluster lens assembly is also disclosed.

20 Claims, 2 Drawing Sheets

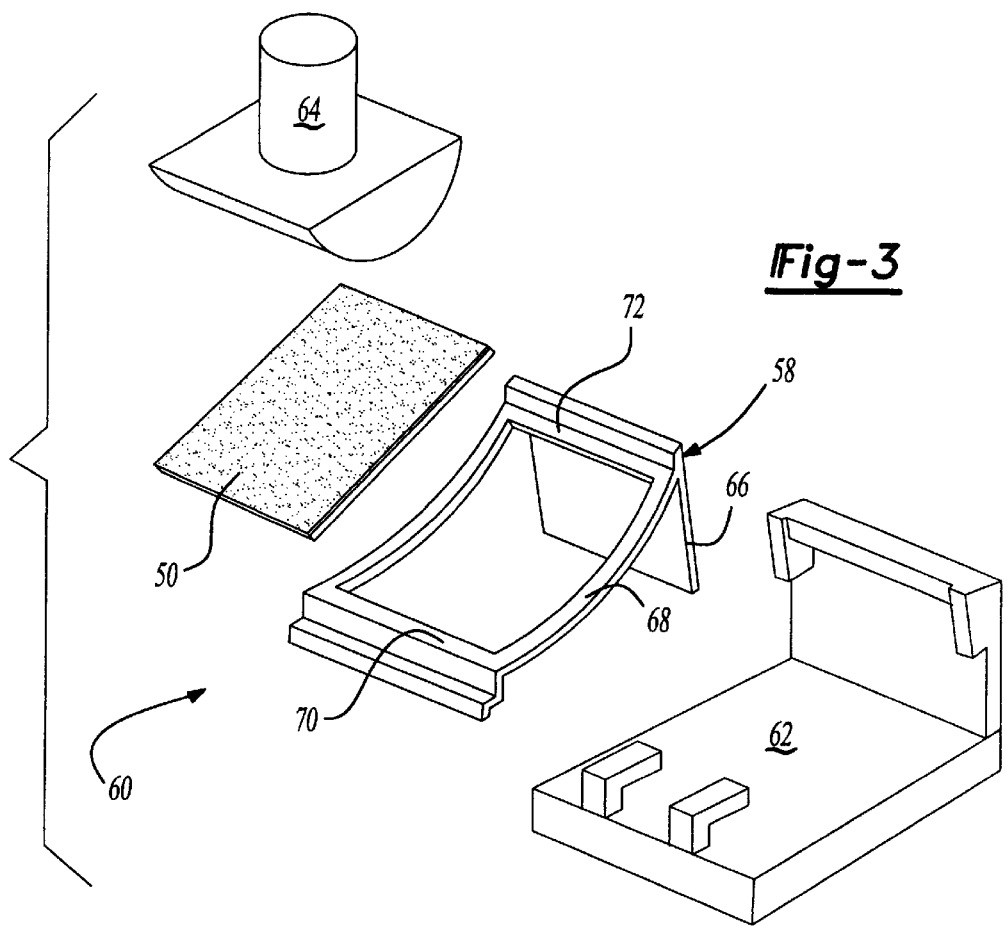
Fig-3
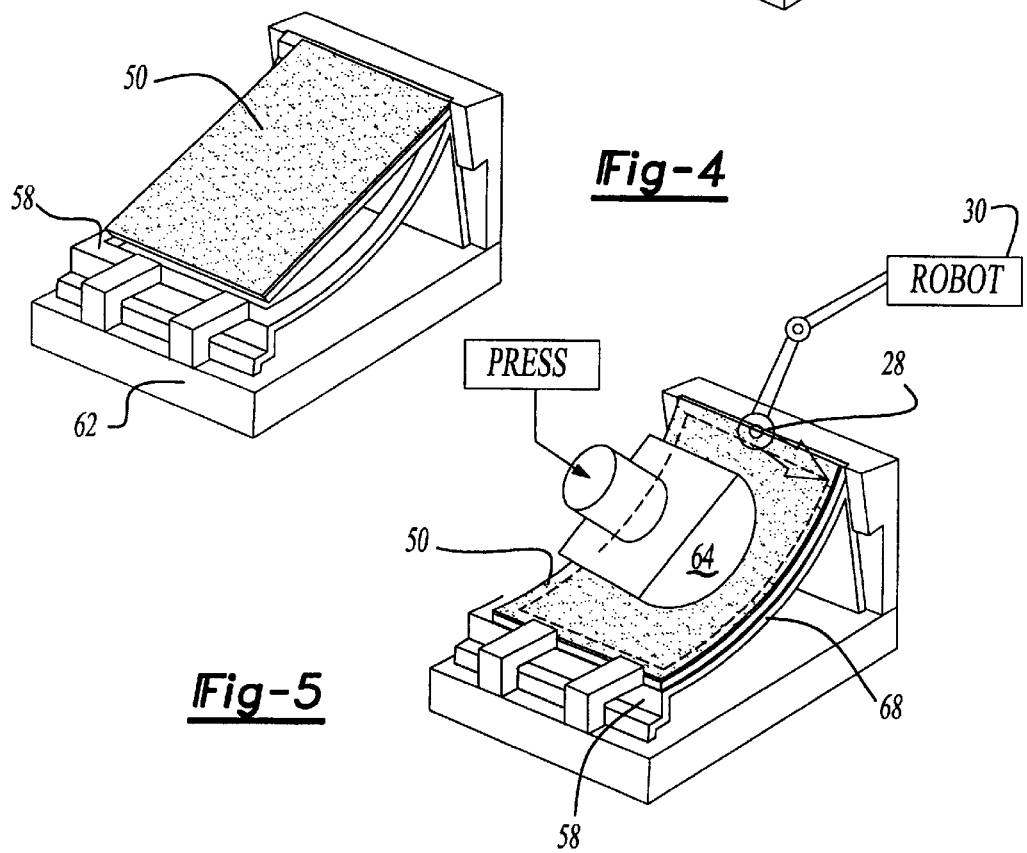
Fig-4
Fig-5

INSTRUMENT CLUSTER LENS ASSEMBLY AND METHOD OF MAKING

FIELD OF THE INVENTION

The present invention relates to an instrument cluster lens assembly having a lens attached to a base. In addition, the present invention relates to a method of manufacturing such an instrument cluster lens assembly.

BACKGROUND OF THE INVENTION

Instrument cluster lens assemblies are commonly used in vehicles to cover a group of gauges and indicators such as a fuel gauge, temperature indicator, speedometer, or tachometer. Some known instrument cluster lens assemblies have an injected molded lens that is connected to a retainer by fasteners such as screws or by ultrasonic or vibration welding.

One known type of instrument cluster lens assembly has a flat lens that is pressed against a curved surface of a retainer by ultrasonic welding apparatus and bonded to the perimeter of the retainer. However, both the retainer and the ultrasonic welding horn must be shaped to conform to the desired lens shape. Thus, each instrument cluster lens assembly must have a uniquely designed ultrasonic welding horn which greatly reduces manufacturing flexibility and increases production costs.

Moreover, ultrasonic and vibration welding require that the welding horn have direct physical contact with the lens, which produces unwanted scratching that leads to quality concerns and an increased number of parts that are rejected as scrap. In addition, ultrasonic and vibration welding require that the entire lens move relative to the retainer to create heat at a weld interface. As welds are initially created, they are also broken due to the relative movement. The scrubbing action between the parts leads to weld lines that have "hairs" along their outer edges. The hairs are visible through the lens and are aesthetically unattractive.

Further, ultrasonic and vibration welding require that the lens and retainer be produced with tighter tolerances because of the need for exact alignment between the mating surfaces of the parts, otherwise, frictional heat would not be generated. In addition, tighter tolerances are required to ensure that the lens and retainer are able to properly align with the shape of the welding horn.

Although laser welding is a known technique for joining two components together, laser welding has historically been used to join two components made from the same material. Accordingly, laser welding has not been successfully used to join a lens and retainer of an instrument cluster assembly because the lens and retainer are usually fabricated from dissimilar materials.

SUMMARY OF THE INVENTION

The present invention is directed to a lens assembly for an instrument cluster comprising a lens having a top surface and a bottom surface and including a mounting portion. A base having at least one lens receiving portion is adapted to be attached to the lens. In addition, the mounting portion of the lens is laser welded to the lens receiving portion of the base to securely connect the lens to the base thereby forming the lens assembly for an instrument cluster.

The lens and the base can be fabricated either from different materials or the same material. Preferably, the lens is generally transparent to laser light and the base is generally opaque to laser light to permit the laser welding to occur at the interface between the mounting portion of the lens and the lens receiving portion of the base. Moreover, the lens can include an acrylic material and the base can include an ABS plastic material.

Further, the lens can optionally include a removable protective film on the top surface that is transparent to laser light for protecting the lens during shipping. A similar removable protective film can be applied to the bottom surface of the lens and be peeled away just prior to assembly of the lens with the base.

The present invention further relates to a method of forming a lens assembly for an instrument cluster comprising the steps of providing a lens having a mounting portion and providing a base having a lens receiving portion. Then, aligning the mounting portion of the lens with the lens receiving portion of the base and laser welding the lens to the base for secure attachment. The laser welding step is performed using a laser having a wavelength between approximately 800 to 1100 nanometers. Preferably, the laser is a diode laser having a wavelength between approximately 800 to 960 nm. Diode lasers are compact in size, cost efficient and can utilize fiber optics to deliver the laser beam to a workpiece.

Still further, the present invention relates to a method of forming a lens assembly for an instrument cluster comprising the steps of providing a substantially planar lens made from flat sheet stock and providing a base having a non-planar lens receiving portion. Another step includes aligning the lens relative to the non-planar lens receiving portion of the base followed by pressing the lens against the base to form a generally non-planar lens. Thereafter laser welding of the non-planar lens to the base occurs for secure attachment. Thus, a non-planar lens can be made without the cost of expensive molding or forming equipment. The laser weld maintains the originally flat lens in its curved, non-planar position that corresponds to the non-planar shape of the lens receiving portion of the base.

The method according to the present invention can further include removing a protective film on a bottom surface of the lens before pressing the lens against the base. Another step includes removing a protective film on a top surface of the lens just before installing the instrument cluster lens assembly in an instrument panel.

Still further, the present invention relates to a method of forming a lens assembly for an instrument cluster comprising the steps of providing a pre-shaped, non-planar lens having a mounting portion and providing a base having a lens receiving portion. A further step includes aligning the mounting portion of the lens with the lens receiving portion of the base and laser welding the lens to the base for secure attachment.

One benefit of the present invention is that no physical contact occurs between the welding apparatus and the lens and the retainer. Thus, the present invention provides the ability to have removable protective film on the top surface of the lens to protect against scratches before, during and after the laser welding process. Additionally, a removable protective film can be provided on the bottom surface until just before laser welding takes place. Thus, the lens can be protected against scratches on both the top and bottom surfaces up to the point of the laser welding step and thereafter still be protected on the top surface. Further, laser welding can be performed from a single side of the lens assembly in contrast to the ultrasonic and vibration welding which requires welding apparatus from both sides. Therefore, less complex fixturing is used with the present invention.

Also, laser welding eliminates the unattractive weld lines having "hairs" along their edges that are inherent with ultrasonic and vibration welding. In addition, the lenses and bases can be made with greater tolerances since laser welding only needs selected mating surfaces and not necessarily an entire perimeter between the component parts. In addition, the lenses and bases can be made with greater tolerances because they do not have to precisely fit the contours of an ultrasonic welding horn.

Another important benefit that the present invention provides is flexible manufacturing. Unlike the prior art attachment techniques, the present invention can have a robot with multiple different programs that move the laser along different paths for welding different lens assembly designs. Thus, it is easier and faster using laser welding to convert a production run between different lens assembly designs. In contrast, prior art methods have unique welding horns for each lens assembly design and require ordering, producing and changing out the special shaped welding horns to convert between production runs.

Further, the present invention provides the ability to fabricate the lens and base from either the same or dissimilar materials. Previously, laser welding could not be used to attach components made from dissimilar materials, however, the present invention utilizes dissimilar materials that have a common melting temperature range. In addition, the present invention permits the lens to be fabricated using any one of several techniques including, for example, flat sheet stock, injection molding or thermo-forming.

BRIEF DESCRIPTION OF THE DRAWINGS

The features and inventive aspects of the present invention will become more apparent upon reading the following detailed description, claims, and drawings, of which the following is a brief description:

FIG. 3 is an exploded perspective view of components and fixturing for assembling an instrument cluster assembly according to a second embodiment of the present invention.

FIG. 4 is a perspective view of the instrument cluster assembly of FIG. 3 before welding.

FIG. 5 is a perspective view of the instrument cluster lens assembly of FIG. 3 during welding.

DETAILED DESCRIPTION OF PREFERRED EMBODIMENTS

Figure 1:
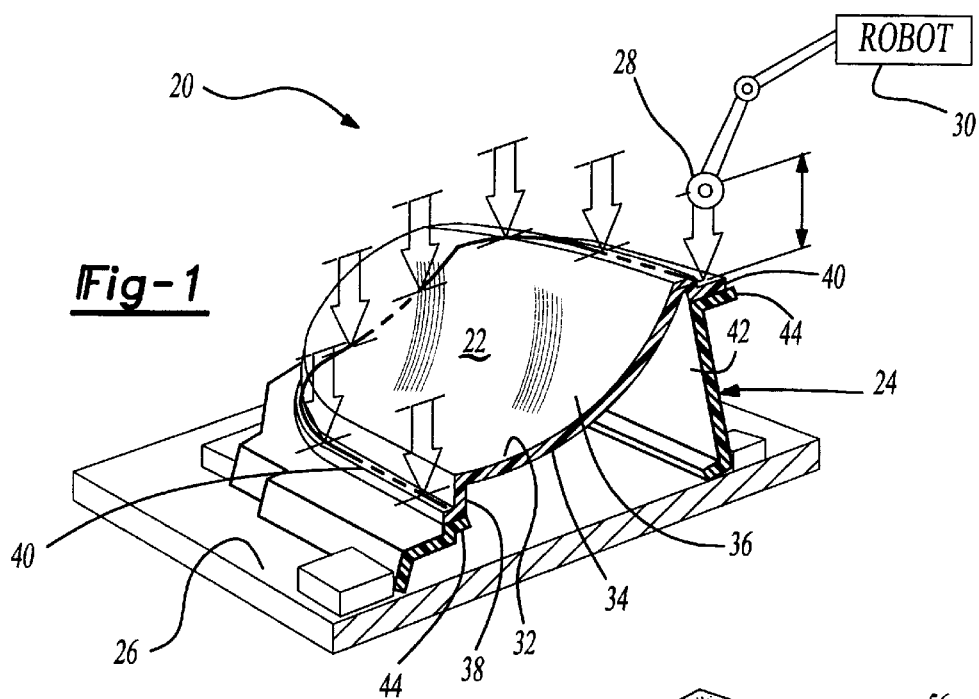
FIG. 1 is a perspective cross sectional view of an instrument cluster lens assembly according to one embodiment of the present invention during a welding process.

FIG. 1 shows an instrument cluster lens assembly 20 having a lens 22 mounted on a base 24 that is retained in a fixture 26 while a laser 28 is used to weld lens 22 to base 24. Laser 28 is preferably carried by a robot 30 for increased laser welding precision. Lens 22 is a pre-shaped non-planar lens having a top surface 32 and a bottom surface 34. Lens 22 can be pre-shaped using any suitable technique including, for example, injection molding, compression molding or thermo-forming. Lens 22 is illustrated having a generally concave central section 36 connected to downwardly projecting sidewalls 38 and an outwardly projecting flange mounting portion 40.

Lens 22 is preferably fabricated from any suitable material that is transparent to laser light. In addition, lens 22 is preferably generally transparent to the human eye to allow viewing of an underlying instrument or indicator. Preferably, lens 22 is fabricated from an acrylic material for improved clarity and strength. Also, lens 22 can optionally include one or more outer protective coatings on the top and/or bottom surfaces 32, 34 for improved resistance to scratching throughout the service life of the lens assembly.

Base 24 has a pre-determined shape that includes at least one sidewall 42 connected to a lens receiving portion 44 for receiving the lens mounting portion 40. Base 24 can be formed from any suitable material. Preferably, base 24 is fabricated from a different material than lens 22 but has a common melt temperature range as the lens 22 material. Preferably, ABS plastic material is used to make base 24. In addition, base 24 is designed to be opaque to laser light for purposes of laser welding.

Laser 28 is guided in a precise manner by robot 30 and selectively emits light at a specific wavelength which passes through lens mounting portion 40, which is transparent to laser light, and is absorbed by lens receiving portion 44 of base 24, which is opaque to laser light. The heat resulting from the absorbed laser radiation is sufficient to begin melting lens receiving portion 44 and since lens 22 and base 24 preferably have melt temperature ranges that overlap, i.e., a common melt temperature range, the mounting portion 40 of lens 22 also begins to melt creating a laser weld between lens 22 and base 24.

Laser 28 can have a wavelength between approximately 800 to 1100 nanometers. Preferably, the laser is a diode laser having a wavelength between approximately 800 to 960 nm. Absorption of laser radiation by base 24 appears to be better at lower wavelengths and it is envisioned that wavelengths less than 960 nm or less than 800 nm can be used. Diode lasers are compact in size, cost efficient and can utilize fiber optics to deliver the laser beam to a workpiece. However, any suitable type of laser or suitable wavelength can be used.

Robot 30 maintains the laser at a fixed distance away from the weld interface at all times resulting in a very consistent, well-defined weld line that can be either continuous or intermittent and has improved visual aesthetics because it eliminates the edge "hairs" that are aesthetically problematic with vibration-type welding.

Figure 2:
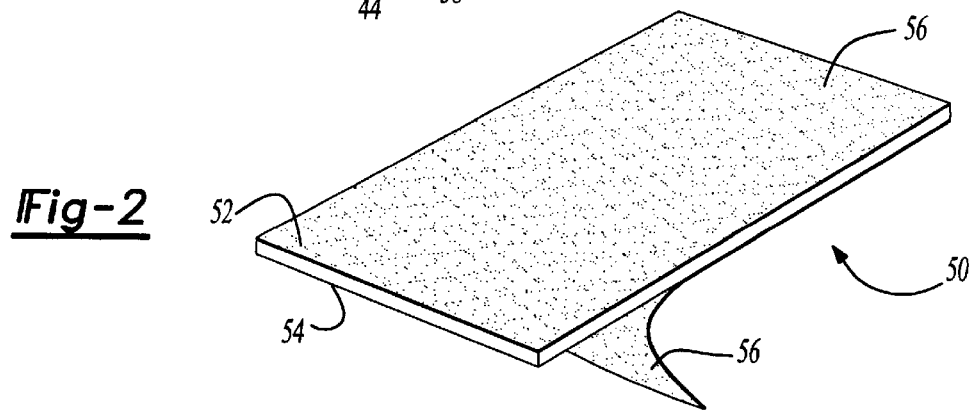
FIG. 2 is a perspective view of a lens made from flat sheet stock for use in a second embodiment of the present invention.

FIG. 2 illustrates a lens 50 for use in an instrument cluster lens assembly according to a second embodiment of the present invention. Lens 50 is cut from a flat sheet stock material. Preferably, the material is acrylic however, any suitable material can be used. Lens 50 has a top surface 52 and a bottom surface 54 and optionally but preferably includes removable protective film 56 on one or both of the top and bottom surfaces 52, 54. The protective film 56 protects the lens 50 during handling and processing. Protective film 56 on bottom surface 54 is removed prior to being mounted on a base 58 for laser welding. Protective film 56 on top surface 52 is preferably transparent to laser light and can remain in place protecting lens 50 throughout manufacturing, shipping, and installation. The top surface protective film 56 can be removed by an end user to ensure maximum protection against damage to the lens.

FIG. 3 shows an exploded view of an instrument cluster lens assembly 60 according to the second embodiment of the present invention and further shows a fixture 62 and a press 64. Lens 50 is generally planar while base 58 includes at least one sidewall 66 connected to a lens receiving portion 68. Lens receiving portion 68 is generally non-planar and is illustrated as defining a generally concave shape. Base 58 is similar to base 24 in terms of the types of material that can be used to fabricate base 58. The base 58 is generally opaque to laser light and has preferably has a common melt temperature range with lens 50. ABS plastic is one preferred material that can be used to fabricate base 58.

As illustrated in FIG. 4, base 58 is securely retained in fixture 62 and lens 50 is aligned relative to base 58.

FIG. 5 shows press 64 pushing lens 50 against the lens receiving portion 68 of base 58 such that the outer periphery of lens 50 contacts the lens receiving portion 68. While lens 50 is being deflected by press 64, laser 28 connected to robot 30 welds selectively around the weld interface between lens 50 and lens receiving portion 68. Thus, the originally planar lens 50 is deflected into a non-planar shape by press 64 that corresponds to the non-planar shape defined by lens receiving portion 68 and base 58. After laser welding lens 50 to base 58, lens 50 maintains a non-planar shape.

Figure 6:
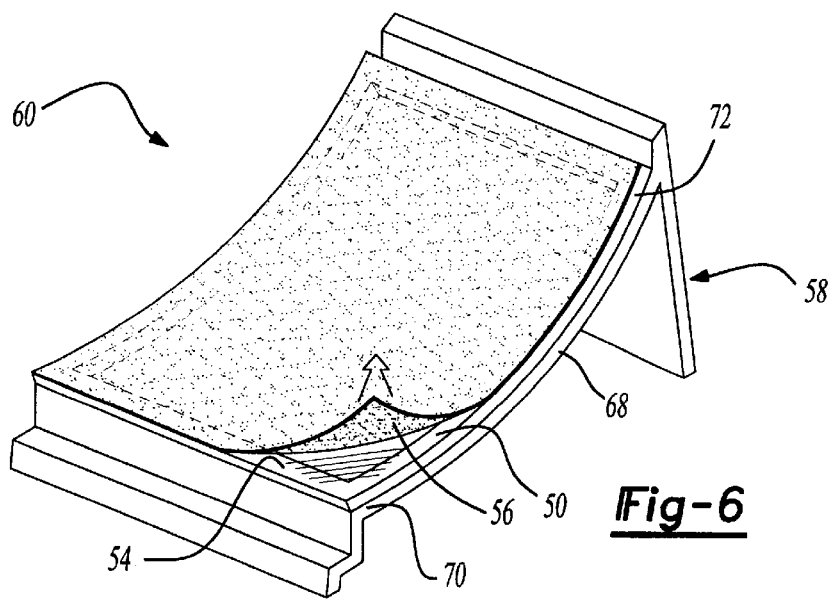
FIG. 6 is a perspective view of an assembled instrument cluster lens after welding.

Instrument cluster lens assembly 60 is shown in FIG. 6 removed from fixture 62 after laser welding lens 50 to base 58. Base 58 has a generally flat portion 70 along the front of lens receiving portion 68. See also FIG. 3. An upper portion 72 of lens receiving portion 68 has a generally arcuate surface for receiving lens 50. To ensure a strong laser weld, it is important to have lens 50 generally parallel to the corresponding portions 70, 72 of the lens receiving portion 68 at weld locations. Further, as shown in FIG. 6, the removable protective film 56 can be peeled away from top surface 54 after instrument cluster lens assembly 60 is installed in an instrument panel.

Preferred embodiments of the present invention have been disclosed. A person of ordinary skill in the art would realize, however, that certain modifications would come within the teachings of this invention. For example, it is envisioned that the lens mounting portion of the lens may be generally opaque to laser light and the lens receiving portion of the base may be generally transparent to laser light. Therefore, the following claims should be studied to determine the true scope and content of the invention.

What is claimed is:

1. A lens assembly for an instrument cluster comprising:
   a lens having a top surface and a bottom surface and including a mounting portion;
   a base having at least one lens receiving portion;
   wherein said lens mounting portion is laser welded by a laser welding apparatus to said lens receiving portion to securely connect said lens to said base thereby forming the lens assembly for an instrument cluster and further wherein the welding apparatus does not physically contact the lens or the receiving portion during welding.

2. The lens assembly of claim 1, wherein said lens and said base are fabricated from different materials.

3. The lens assembly of claim 1, wherein said lens is generally transparent to laser light.

4. The lens assembly of claim 1, wherein said base is generally opaque to laser light.

5. The lens assembly of claim 1, wherein said lens includes an acrylic material.

6. The lens assembly of claim 1, wherein said base includes an ABS plastic material.

7. The lens assembly of claim 1, wherein said lens further includes a removable protective film on said top surface that is transparent to laser light for protecting said lens during shipping.

8. A method of forming a lens assembly for an instrument cluster comprising the steps of:
   providing a lens having a mounting portion;
   providing a base having a lens receiving portion;
   aligning said mounting portion of said lens with said lens receiving portion of said base;
   laser welding said lens to said base for secure attachment.

9. The method of claim 8, wherein said laser welding is performed by a diode laser.

10. The method of claim 8, wherein said laser is operated at a wavelength between approximately 800 to 1100 nanometers.

11. The method of claim 8, wherein said laser is operated at a wavelength between approximately 800 to 960 nanometers.

12. The method of claim 8, wherein said laser is operated at a wavelength less than approximately 960 nanometers.

13. A method of forming a lens assembly for an instrument cluster comprising the steps of:
   providing a substantially planar lens made from flat sheet stock;
   providing a base having a non-planar lens receiving portion;
   aligning said lens relative to said non-planar lens receiving portion of said base;
   pressing said lens against said base to form a generally non-planar lens; and
   providing a laser welding apparatus and laser welding said non-planar lens to said base for secure attachment wherein the welding apparatus does not physically contact the lens or the receiving portion during welding.

14. The method of claim 13, further comprising removing a protective film on a bottom surface of said lens before pressing said lens against said base.

15. The method of claim 13, further comprising removing a protective film on a top surface of said lens just before installing said instrument cluster lens assembly in an instrument panel.

16. The method of claim 13, wherein said laser welding is performed by a diode laser.

17. The method of claim 13, wherein said laser is operated at a wavelength less than approximately 960 nanometers.

18. A method of forming a lens assembly for an instrument cluster comprising the steps of:
   providing a pre-shaped, non-planar lens having a mounting portion;
   providing a base having a lens receiving portion;
   aligning said mounting portion of said lens with said lens receiving portion of said base;
   providing a laser welding apparatus and laser welding said lens to said base for secure attachment wherein the welding apparatus does not physically contact the lens or the receiving portion during welding.

19. The method of claim 18, wherein said laser welding is performed by a diode laser.

20. The method of claim 18, wherein said laser is operated at a wavelength less than approximately 960 nanometers.

* * * * *